(No Model.)

F. A. MATHEWS.
CURTAIN PIN.

No. 413,952. Patented Oct. 29, 1889.

Witnesses
H. D. Nealy.
P. W. Fowler.

Inventor
Fannie A. Mathews,
By her Attorneys
A. H. Evans & Co.

UNITED STATES PATENT OFFICE.

FANNIE AYMAR MATHEWS, OF NEW YORK, N. Y.

CURTAIN-PIN.

SPECIFICATION forming part of Letters Patent No. 413,952, dated October 29, 1889.

Application filed June 7, 1889. Serial No. 313,484. (No model.)

*To all whom it may concern:*

Be it known that I, FANNIE AYMAR MATHEWS, a citizen of the United States, residing at New York, in the county of New York and State of New York, have invented certain new and useful Improvements in Curtain-Pins; and I do hereby declare the following to be a full, clear, and exact description of the invention, such as will enable others skilled in the art to which it appertains to make and use the same.

My invention relates to curtain and other pins; and it consists in the peculiarly-constructed pin hereinafter fully described and claimed.

Figure 1:
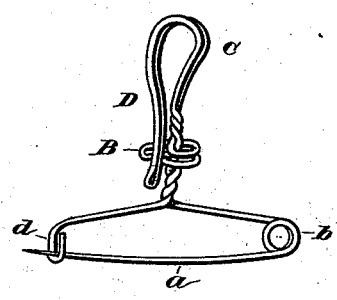
Figure 2:
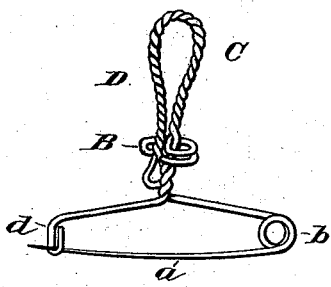

Figures 1 and 2 represent perspective views of my improved curtain-pin.

In the construction of my hook I employ a single piece of wire which is bent at or near the middle and the opposite ends fashioned to form the main hook D. Those portions of the wire which form the shank C of said hook are twisted together for a short distance, and while one of the ends of the wire is continued in a straight line the other end is bent at right angles with shank portion. Thence it extends laterally in front of the shank and is returned to the shank, where it meets the other end of the wire, when the two ends are again twisted together for a short distance and then bent in opposite directions, one end being formed with a catch $d$, while the other is formed with a coil $b$ and an arm $a$, whose point is adapted to be confined within the catch $d$ in the usual manner. By utilizing one of the arms of the main wire in the manner described I form the catch or hook B directly in front of the shank of the main hook D, and in a position where this hook D may be pressed into engagement with the catch B and thereby held against any strain that might come upon it.

If desired, the shank and the main hook D may be twisted throughout their length, as shown in Fig. 2, but the catch B will be formed in the manner previously stated and will be adapted for engagement with the main hook.

Having thus described my invention, what I claim as new, and desire to secure by Letters Patent, is—

1. As an article of manufacture, a curtain hook and pin made of a single piece of wire having the hook D and shank C, of two strands, one of said strands being extended laterally near the end of the shank to form a catch for the hook D, substantially as described.

2. As an article of manufacture, a curtain hook and pin made of a single piece of wire having the hook D and shank C, of two strands, one of which is extended laterally near the end of the shank to form a catch for the hook D, the said strands branching in opposite directions at the end of the shank and being formed with a spring-pin and a catch therefor, substantially as described.

In testimony whereof I affix my signature in presence of two witnesses.

FANNIE AYMAR MATHEWS.

Witnesses:
SARA E. MATHEWS,
M. BARNETT.